US009332186B2

(12) United States Patent
Johansson et al.

(10) Patent No.: US 9,332,186 B2
(45) Date of Patent: May 3, 2016

(54) METHOD FOR COMPENSATING MOTION BLUR IN CONNECTION WITH VIBRATIONS

(71) Applicant: FLIR Systems AB, Täby (SE)

(72) Inventors: Emanuel Johansson, Wellington (SE); Odd Larson, Alvsjo (SE); Erland Waldreus, Akersberga (SE)

(73) Assignee: FLIR Systems AB, Taby (SE)

( * ) Notice: Subject to any disclaimer, the term of this patent is extended or adjusted under 35 U.S.C. 154(b) by 0 days.

(21) Appl. No.: 14/410,040

(22) PCT Filed: Jun. 11, 2013

(86) PCT No.: PCT/SE2013/000096
§ 371 (c)(1),
(2) Date: Dec. 19, 2014

(87) PCT Pub. No.: WO2013/191611
PCT Pub. Date: Dec. 27, 2013

(65) Prior Publication Data
US 2015/0189183 A1   Jul. 2, 2015

(30) Foreign Application Priority Data

Jun. 20, 2012   (SE) ..................................... 1230067

(51) Int. Cl.
*H04N 5/228* (2006.01)
*H04N 5/232* (2006.01)
(Continued)

(52) U.S. Cl.
CPC ............ *H04N 5/23267* (2013.01); *G06T 5/003* (2013.01); *H04N 5/142* (2013.01); *H04N 5/23212* (2013.01); *G06T 2207/20201* (2013.01); *H04N 5/23254* (2013.01)

(58) Field of Classification Search
None
See application file for complete search history.

(56) References Cited

U.S. PATENT DOCUMENTS 5,708,477 A * 1/1998 Forbes ................ G11B 15/087
348/552

(Continued)

FOREIGN PATENT DOCUMENTS

DE       102010019399       11/2011

OTHER PUBLICATIONS

Yi Yao et al., "Digital Imaging with Extreme Zoom: System Design and Image Restoration", Computer Vision Systems, 2006 ICVS '06, IEEE International Conference on New York, NY, USA Jan. 4-7, 2006, Piscataway, NJ, USA, IEEE, ISBN 978-0-7695-2506-8; ISBN 0-7695-25606-7; abstract.

(Continued)

*Primary Examiner* — Roberto Velez
*Assistant Examiner* — Wesley J Chiu
(74) *Attorney, Agent, or Firm* — Haynes and Boone, LLP

(57) ABSTRACT

The invention relates to a method for compensating motion blur in connection with vibrations in an image recording apparatus (1), such as a camera, for stabilization of recorded images, wherein use is made of a reference image. According to the invention, a frame (2) of a recorded image is selected for image stabilization and the degree of sharpness (3) in the selected frame is evaluated and compared (5) with a previously saved reference value (4) for the degree of sharpness for a previously selected frame. The last chosen frame is used to update (6) a video sequence and the degree of the sharpness for the last chosen frame is saved (7) as a new reference value if the degree of sharpness for the last chosen frame is deemed to be better (5) than or equally as good as the reference value for the degree of sharpness for a previously selected frame. The reference value (4) for the degree of sharpness for a previously selected frame is saved with reduction (8) of the value of sharpness and the previously selected frame is used in the video sequence if the degree of sharpness for the last chosen frame is deemed to be worse (5) than the reference value for the degree of sharpness for the previously selected frame. As a result of the invention, a method which, by relatively simple action, can effectively compensate for motion blur in connection with vibrations is provided.

20 Claims, 1 Drawing Sheet

(51) Int. Cl.
*G06T 5/00* (2006.01)
*H04N 5/14* (2006.01)

(56) References Cited

U.S. PATENT DOCUMENTS

| | | | |
|---|---|---|---|
| 2004/0066563 | A1 | 4/2004 | Voss et al. |
| 2006/0257042 | A1 | 11/2006 | Ofek et al. |
| 2008/0266406 | A1* | 10/2008 | McLeod ............ H04N 5/23248 348/208.16 |
| 2009/0015921 | A1 | 1/2009 | Yoon et al. |
| 2009/0086036 | A1* | 4/2009 | Safaee-Rad .......... H04N 5/2253 348/208.6 |
| 2011/0025919 | A1 | 2/2011 | Vorontsov et al. |
| 2011/0129167 | A1 | 6/2011 | Nojima et al. |
| 2011/0228132 | A1* | 9/2011 | Umeyama .......... H04N 5/23232 348/231.99 |
| 2012/0121202 | A1 | 5/2012 | Wang et al. |

OTHER PUBLICATIONS

Ojansivu V et al., "Motion Blur Concealment of Digital Video Using Invariant Features", Advanced Concepts for Intelligent Vision Systems Lecture Notes in Computer Science; LNCS, Jan. 1, 2006, Springer, Berlin, DE, vol. 4179, p. 35-45, ISBN 978-3-540-44630-9; ISBN 3-540-44630-3; abstract.

* cited by examiner

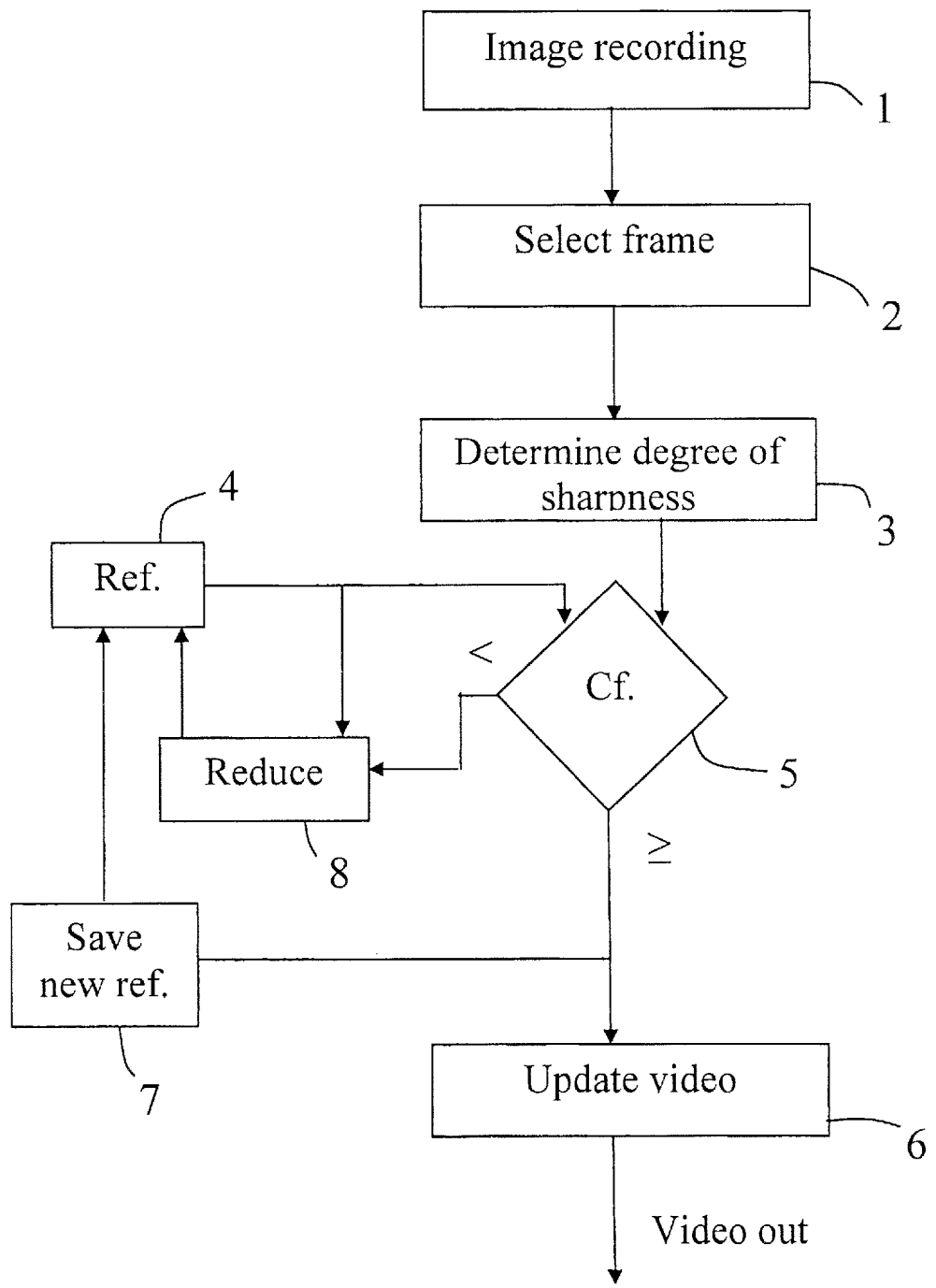

METHOD FOR COMPENSATING MOTION BLUR IN CONNECTION WITH VIBRATIONS

TECHNICAL FIELD

The present invention relates to a method for compensating motion blur in connection with vibrations in an image recording apparatus, such as a camera, for stabilization of recorded images, wherein use is made of a reference image.

BACKGROUND

Motion blur in connection with vibrations is a very common problem in cameras in general and, in particular, for cameras intended for long distances, so called "long range" cameras. There is therefore a desire to find a simple image-stabilizing method which can help the operator of a camera under difficult conditions in which vibrations make it very difficult to detect and identify targets. One application can be to achieve image stabilization of an image recording camera mounted on a mast.

Compensation for vibrations in connection with video recording is previously known per se and in this context reference can be made to published US application US2011/0025919 A1. According to this publication, there is a shake compensation step 204 utilizing a reference image described in paragraph [0021]. The said publication additionally proposes a solution for reducing the effect of turbulence by assessing the sharpness of image sequences and joining together the parts which have best sharpness into an image which can be presented. The sharpness can be assessed by the use of edge-detecting filters.

SUMMARY OF THE INVENTION

The object of the present invention is to provide a method which, by relatively simple action, can effectively compensate for motion blur in connection with vibrations.

The object of the invention is achieved by a method characterized in that a frame of a recorded image is selected for image stabilization, in that the degree of sharpness in the selected frame is evaluated and compared with a previously saved reference value for the degree of sharpness for a previously selected frame, in that the last chosen frame is used to update a video sequence and the degree of the sharpness for the last chosen frame is saved as a new reference value if the degree of sharpness for the last chosen frame is deemed to be better than or equally as good as the reference value for the degree of sharpness for a previously selected frame, in that the reference value for the degree of sharpness for a previously selected frame is saved with reduction of the value of the sharpness and the previously selected frame is used in the video sequence if the degree of sharpness for the last chosen frame is deemed to be worse than the reference value for the degree of sharpness for the previously selected frame.

By virtue of the proposed method, an effective compensation of motion blur caused by vibrations is achieved. For each frame, the degree of sharpness is evaluated and the sharpness is compared with a previously saved value. If the sharpness is deemed to be better or equally as good, this frame is used and the video is updated, at the same time as a new sharpness value is saved for this frame. If it is instead deemed that the sharpness was previously better, the earlier frame is used instead. In order not to freeze the image for too long, the sharpness value must however decline a little each time an old frame is used. In this way, only information which actually means something for the operator is used. The result of the application of the method is that the actual image clock will be able to vary, but that the target for the image recording apparatus becomes easier to identify. In this context, it can be emphasized that unfocused data do not impart any added value to the image. The proposed method is especially suitable for use where courses of events are less rapid and in which panning occurs in small measure.

By virtue of the method, the user is presented only with usable information. An image which is generated by the method is felt to be more stable and more pleasant to view, which leads to it being easier to detect and identify targets.

Expediently, operations which form part of the method are executed in real time.

According to a proposed suitable method, the choice of frame in an image recorded by an image recording device is made in the centre of the image.

According to another proposed suitable method, the choice of frame in an image recorded by an image recording device is made by the user of the image recording apparatus.

According to yet another proposed suitable method, the image stabilization is activated by the user of the image recording apparatus. By virtue of a user-activated function of this kind, in which borderline cases such as panning and the like can be disregarded, a method which is optimized to present information to the operator/user under really difficult conditions is achieved.

In a method for compensating blur according to the basic principle above, the image recording is advantageously conducted within the infrared range.

Where the reference value for the degree of sharpness has to be reduced, this can be done in many ways. A simple proposed method is to execute the reduction of the value of the sharpness with substantially the same percentage of the value for each repeated reduction. For example, a reduction of about 5 percent can be made each time. Another variant can be to choose a more progressive reduction/decline in order to avoid a situation in which the image is frozen for too long. It is also possible to limit the number of times in which a reduction of the value of the sharpness can be permitted.

In order to determine the value of the sharpness for a frame, a method characterized in that the value of the sharpness for a frame is determined by the application of an edge-detecting filter is proposed. A proposed edge-detecting filter of this kind comprises the use of a Tenengrad operator. Another proposed edge-detecting filter comprises calculation of simple standard deviation for each pixel included in the frame.

As a result of the above described methods, further usage options are opened up. For example, methods according to the above can be applied in connection with continuous autofocusing. By preserving the sharpness when the image is defocused, both larger and more rapid search algorithms for finding the best focus can be used without disturbing the operator.

BRIEF DESCRIPTION OF THE DRAWING

The invention will be further described below in exemplified form with reference to the appended drawing showing a schematic flowchart illustrating the principles behind the invention.

DETAILED DESCRIPTION OF EMBODIMENTS

The flowchart starts with a block 1 designated as image recording. Here the images which are to be image-processed are acquired. For acquisition, preferably some form of camera (not shown in detail) is included. The camera can be an IR camera, but does not preclude the use of other cameras or sensors. In a block 2, a frame is selected in an image available from the image recording block 1. Expediently, the frame is fetched from the central part of the image, which, if there are differences in image quality, is deemed to have on average better quality and probably also to contain more interesting and more usable information. The choice of frame can be made by the user. This can be done by moving the frame over the image and locking it in suitable position. In another alternative, the user can control the camera so that the desired portion ends up in the middle of the image, after which a central frame is fetched.

In the block 3, the degree of sharpness of the frame selected in the block 2 is determined. Preferably, an edge-detecting filter is applied and filters comprising the use of a Tenengrad operator, or alternatively filters comprising calculation of simple standard deviation for each pixel included in the frame are especially proposed. Where the Tenengrad operator is used, in principle a new image is formed and a sharpness value is obtained by summating the pixel values over this Tenengrad image.

In a block 4, reference values for the degree of sharpness of chosen frames are stored. The block 4 is now presumed to contain a reference value from a previously processed frame, or alternatively, upon the commencement of the process a suitable start value which lies below the level for a frame with good sharpness.

A block 5 is arranged to compare the degree of sharpness determined in the block 2 with the degree of sharpness of the reference value stored in the block 4. Where the comparison reveals that the degree of sharpness determined in the block 2 is greater than or substantially the same as the reference value, a video sequence is upgraded with the last image in the block 6. In addition, a block 7 sees to it that the reference value which is stored in block 4 is replaced with a new reference value. Where the comparison reveals that the degree of sharpness determined in the block 2 is less than the reference value, no updating of the video sequence takes place, but rather the earlier image remains in place as a result of the block 6 remaining inactive. In addition, a block 8 sees to it that the stored reference value is reduced by fetching the reference value in the block 4 and again storing a reduced reference value. The reduction can be made in percent of the reference value. Percentage values in the order of magnitude of 5 percent have been shown to work well. It can be expedient to keep within a range of between 3 and 10 percent. A further function (not shown in detail) can be included, which function counts the number of times a reference value has been reduced and only permits a limited number of reductions. It is also proposed that the reduction of the degree of sharpness of the reference value can be realized progressively.

The flowchart described schematically above is primarily suited to illustrating the underlying principles to the invention, without, however, in any way unlocking the inventive concept to described block functions.

The invention is not limited to the method described above by way of example, but can be subject to modifications within the scope of the following patent claims.

The invention claimed is:

1. A method for processing image data for image stabilization, the method comprising:
   receiving an image from an image recording device;
   selecting a portion of the received image;
   determining a degree of sharpness the selected portion of the received image;
   comparing the determined degree of sharpness for the selected portion of the received image against a reference value, the reference value representing a degree of sharpness for a select portion of a previously used image in a video sequence;
   updating the video sequence with the received image and saving the determined degree of sharpness for the selected portion of the received image as a new reference value, if the determined degree of sharpness is greater than or equal to the reference value; and
   reducing the reference value, saving the reduced reference value as the new reference value, and keeping the previously used image in the video sequence, if the determined degree of sharpness is less than the reference value.

2. The method according to claim 1, wherein the portion of the image is selected from a central portion of the image.

3. The method according to claim 1, wherein the portion of the image is selectable by a user of the image recording device.

4. The method according to claim 1, wherein the method is performed for image stabilization in response to an activation by a user of the image recording device.

5. The method according to claim 1, wherein the image recording device comprises an infrared (IR) camera, and wherein the receiving of the image comprises receiving an IR Image from the IR camera.

6. The method according to claim 1, wherein the degree of sharpness for the selected portion of the received image is determined by an application of an edge-detecting filter.

7. The method according to claim 6, wherein the edge-detecting filter comprises a use of a Tenengrad operator.

8. The method according to claim 6, wherein the edge-detecting filter comprises calculation of simple standard deviation for each pixel included in the selected portion of the received image.

9. The method according to claim 1, wherein the method is used in connection with autofocusing of a camera.

10. The method according to claim 1, wherein the reducing of the reference value is repeated for each new selected image portion for which the determined degree of sharpness is less than the reference value.

11. The method according to claim 10, wherein the reducing of the reference value is executed with the same percentage of the reference value for each repeated reducing.

12. The method according to claim 10, wherein the number of times that the reducing of the reference value is permitted is limited.

13. The method according to claim 10, wherein the reducing of the reference value is executed progressively.

14. A camera adapted for processing image data, the camera comprising:
   a sensor configured to acquire an image; and
   an image processor configured to:
      select a portion of the acquired image,
      determine a degree of sharpness in the selected portion of the acquired image,
      compare the determined degree of sharpness for the selected portion of the acquired image against a reference value, the reference value representing a degree of sharpness for a previously used image in a video sequence,
      update the video sequence with the acquired image and save the determined degree of the sharpness for the selected portion of the acquired image as a new reference value, if the determined degree of sharpness is greater than or equal to the previously used reference value, and reduce the reference value, save the reduced reference value as the new reference value, and keep the previously used image in the video sequence, if the determined degree of sharpness is less than the reference value.

15. The camera according to claim 14, wherein the portion of the image is selected, from a central portion of the image.

16. The camera according to claim 14, wherein the portion of the image is selectable by a user of the camera.

17. The camera according to claim 14, wherein the sensor comprises an infrared (IR) sensor configured to acquire an IR image.

18. The camera according to claim 14, wherein the degree of sharpness for the selected portion of the acquired image is determined by an application of an edge-detecting filter.

19. The camera according to claim 14, wherein the image processor is configured to repeat reduction of the reference value for each new selected image portion for which the determined degree of sharpness is less than the reference value.

20. The camera according to claim 19, wherein the image processor is configured to reduce of the reference value with substantially the same percentage of the reference value for each repeated reduction.

* * * * *